United States Patent [19]

Espinoza

[11] Patent Number: 4,458,385
[45] Date of Patent: Jul. 10, 1984

[54] AVIONIC CLAMP HAVING SEPARATE STRAP AND LOCKING MEMBER

[75] Inventor: Cesar Espinoza, Buena Park, Calif.

[73] Assignee: Hollingsead International, Inc., Santa Fe Springs, Calif.

[21] Appl. No.: 380,297

[22] Filed: May 20, 1982

[51] Int. Cl.³ .............................................. B65D 63/10
[52] U.S. Cl. ............................... 24/16 PB; 24/17 AP; 248/74.5
[58] Field of Search ........... 24/17 AP, 16 PB, 30.5 P, 24/17 A; 248/74.3, 74.4, 74.5

[56] References Cited

U.S. PATENT DOCUMENTS

| 3,542,321 | 11/1970 | Kahabka | 24/16 PB |
|---|---|---|---|
| 3,568,262 | 3/1971 | Woldman | 24/16 PB |
| 3,672,615 | 6/1972 | Florentino | 24/16 PB |
| 3,875,618 | 4/1975 | Schuplin | 24/16 PB |
| 3,949,449 | 4/1976 | Cavenly et al. | 24/16 PB |
| 3,967,345 | 7/1976 | Sumimoto | 24/16 PB |
| 4,135,272 | 1/1979 | Stephenson | 24/16 PB |

FOREIGN PATENT DOCUMENTS 2615821  11/1976  Fed. Rep. of Germany ... 24/16 PB

Primary Examiner—Paul J. Hirsch
Attorney, Agent, or Firm—Jackson, Jones & Price

[57] ABSTRACT

A wire bundle or cable clamp primarily adapted for use in the aviation industry is disclosed. The clamp includes a flexible strap having a serrated portion and a strap receiving member to which the strap is removably mounted. A pawl including a serrated plate is pivotally mounted to the strap receiving member, and is biased to permanently but reversibly engage the serrations of the strap which is looped around an object such as a cable, wire bundle or the like.

20 Claims, 6 Drawing Figures

AVIONIC CLAMP HAVING SEPARATE STRAP AND LOCKING MEMBER

BACKGROUND OF THE INVENTION

1. Field of the Invention

The present invention is broadly directed to cable and wire bundle clamps. More specifically, the present invention is directed to avionic cable or wire bundle clamp assemblies which require no tools for fastening the clamp about a cable or bundle of wire.

2. Brief Description of the Prior Art

Wire bundle clamps, hose clamps and the like have been known in the prior art for a long time.

Most wire bundle and hose clamps of the prior art have an elongated strap which is designed to be disposed around the wire bundle, hose, or other object to be gripped, and a fastener or strap receiving member. The fastener or strap receiving member is usually permanently attached to one end of the strap. The other end of the strap is passed through an opening in the strap receiving member and is movably attached thereto by the use of a worm or like screw. The size of the opening or loop of the strap is then adjusted, i.e., the object is then gripped by turning of the worm or screw with a suitable tool such as a screwdriver or wrench. Examples of wire bundle or hose clamps of the above noted type are found in U.S. Pat. Nos. 4,021,892, 3,914,832, 4,047,268, 3,924,308, 4,103,637, and 4,099,304; and in British patent specification Nos. 1,500,073 and 363,973.

Another basic type of wire bundle clamp requires no tools for adjustment of the length of the looped strap around the object to be gripped. Wire bundle clamps of this type are typically made as one-piece, integrally constructed devices, and include a strap and a head or housing integrally molded with the strap. The head or housing includes a strap receiving slot, and an integrally molded pawl. Both the strap and the pawl are provided with appropriately positioned teeth or serrations. The pawl is configured to snap into locking position within the slot and to engage and permanently lock the strap therein. Wirebundle clamps of this, or similar type, are described in U.S. Pat. Nos. 3,127,648, 3,900,922, 2,936,980, 3,537,146, and 3,660,869.

Additional disclosures generally relating to the subject of wire bundle or hose clamps, or bands or straps of adjustable length for gripping objects are found in U.S. Pat. Nos. 3,214,808 and 3,570,497 and in British patent specification Nos. 1,013,500 and 1,006,129.

As is well appreciated by those skilled in the art, cable, wire bundle, or hose clamps and the like utilized in the relatively hostile environment of an aircraft should ideally meet special, strict requirements. Briefly, in an aircraft environment, numerous cables and wire bundles are assembled to special racks in very limited space. Because of the critical importance of certain electric and electronic circuits in civilian and military aircraft for flight safety and ability for effective combat, inadvertent overtightening of the clamps must be avoided in order to eliminate damage to the cables. Moreover, the cable or wire bundle clamps of an aircraft are often subjected to extreme temperatures, such as heat emanating from an engine, or the freezing cold of the ambient atmosphere surrounding an aircraft flying at high altitudes. In addition, cable or wire bundle clamps utilized in an aircraft must be essentially fail-proof, even under exposure to constant and severe vibration, and yet adapted for easy and quick disassembly for servicing of the electric and electronic components.

In an effort to fill the need in the prior art for cable, wire bundle and hose clamps adapted for use in aircrafts, a clamp was developed which, inter alia, intrinsically limits the amount of force utilizable by a mechanic who tightens the clamp. This clamp is described in U.S. Pat. No. 4,303,216, assigned to the same assignee as the present application.

The clamp described in U.S. Pat. No. 4,303,216 is, however, of the worm or screw-tightened type. Therefore, a tool such as a screwdriver or wrench is still required to tighten the clamp around a cable or wire bundle. On the other hand, cable or wire bundle clamps of the prior art, which require no tool for tightening, are not generally well adapted for use in an aircraft environment. A principal disadvantage of the prior art clamps described in the U.S. Pat. Nos. 3,127,648, 3,900,922, 2,936,980, 3,537,146, and 3,660,869 is that these cable clamps, once tightened, are not readily disassembled. For example, U.S. Pat. No. 3,537,146 specifically states that after tightening, the excess of the strap protruding above the strap receiving housing may even be cut off. This further demonstrates that the cable tie of that patent is primarily designed for one-time use only.

Accordingly, the present invention is designed to fill the need in the prior art for a cable or wire bundle clamp which generally meets the requirement of an aircraft environment and which can be tightened, released and reused without the application of tools.

SUMMARY OF THE INVENTION

It is an object of the present invention to provide a cable or wire bundle clamp which is primarily adapted for use in the generally hostile environment of an operating aircraft.

It is another object of the present invention to provide a cable or wire bundle clamp which can be tightened, released and reused without the application of tools.

These and other objects and advantages are attained by a cable or wire bundle clamp assembly which has a substantially rigid strap receiving member and a flexible strap removably attached to the strap receiving member. The strap has an intermediate serrated portion, and a serrated pawl is pivotally mounted to the strap receiving member to occupy at least two positions thereon.

In a first position of the pawl the respective serrations of the pawl and of the strap engage each other, whereby the strap is locked into position relative to the strap receiving member. In a second position of the pawl, the respective serrations are disengaged from one another and the strap is freely moved relative to the strap receiving member to enlarge or decrease the loop formed by the strap. At least one element is operatively associated with the pawl and the strap receiving member to bias the pawl into the first position, whereby the pawl is locked into engagement with the strap. The biasing force of the element may be overcome, however, by an outside force to move the pawl into the second position wherein the strap is freely movable relative to the strap receiving member.

The features of the present invention can be best understood, together with further objects and advantages, by reference to the following description, taken in connection with the accompanying drawings wherein like numerals indicate like parts.

DESCRIPTION OF THE PREFERRED EMBODIMENT

The following specification, taken in conjunction with the drawings, sets forth the preferred embodiment of the present invention in such a manner that any person skilled in the wire bundle or hose clamp manufacturing arts can use the invention. The embodiments of the invention disclosed herein are the best modes contemplated by the inventor for carrying out his invention in a commercial environment, although it should be understood that various modifications can be accomplished within the parameters of the present invention.

Figure 1:
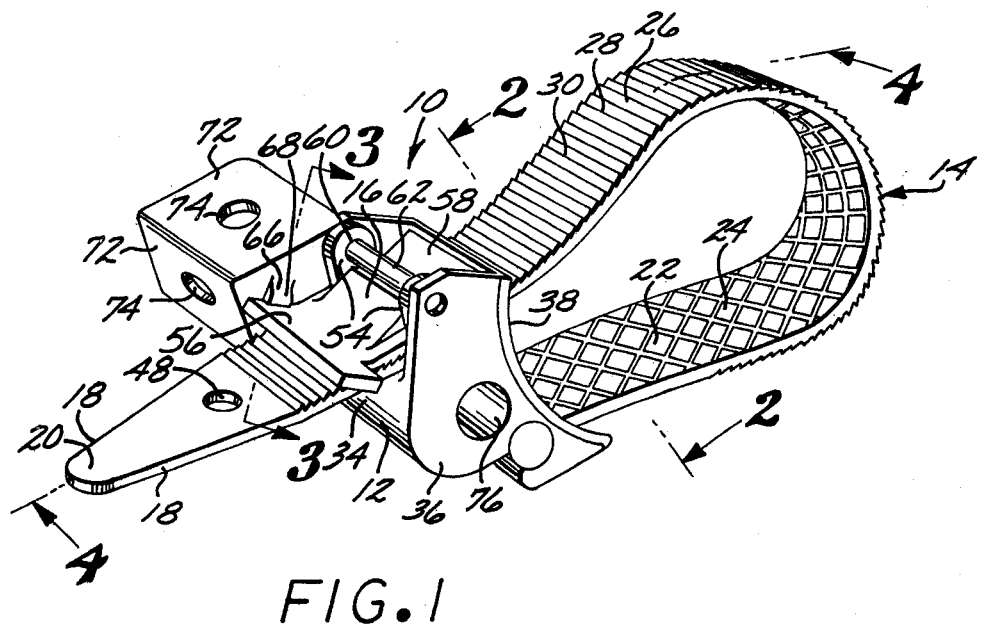
FIG. 1 is a perspective view of a first preferred embodiment of the wire bundle clamp of the present invention.

Referring now to FIGS. 1–6, and particularly to the perspective view of FIG. 1, a first preferred embodiment of the avionic cable or wire bundle clamp 10 of the present invention is disclosed. It should be noted at the outset that although the cable or wire bundle clamp 10 of the present invention is primarily designed for use in civilian and military aircraft, it may also be used in many other applications, such as, for example, in the automobile industry. Furthermore, even though in the present specification the specific advantages of the clamp 10 are primarily described as applicable in the aircraft industry, the scope of the present invention is not intended to be restricted in that manner.

The wire bundle clamp 10 includes the following major component parts: A strap receiving member or housing 12, a strap 14, and a pawl member or pawl 16, which is mounted for limited pivoting movement relative to the strap receiving member or housing 12. As is described below in detail, the pawl 16 is mounted to the strap receiving member or housing 12 in such a manner that the pawl 16 is normally biased to lock the strap 14 relative to the housing 12, and to grip a plurality of objects such as the bundle of wires 17.

The strap 14 is an elongated substantially flat, flexible member having tapered sides 18 adjacent to the front end 20 thereof. A first major surface 22 of the strap 14 has a raised grid-like pattern 24, the purpose of which is to render the surface 22 of the strap 14 less slippery and to facilitate the gripping of the wire bundle 17.

The second major surface 26 of the strap 14 includes an intermediate portion 28 which, in effect, comprises the major part of the total length of the strap 14. The second surface 26 is provided on its intermediate portion 28 with a plurality of regularly spaced parallel aligned serrations 30. The serrations 30, which are best shown on FIGS. 4, 5 and 6, act as teeth to engage complementary serrations in the pawl 16 to lock the strap 14 into its object-gripping configuration shown on FIG. 1.

Figure 4:
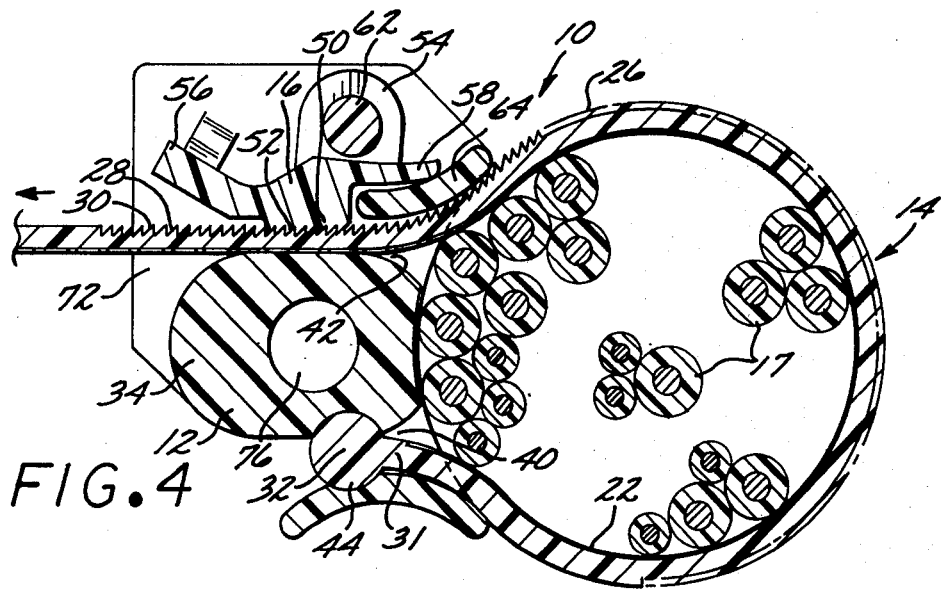
FIG. 4 is still another cross-sectional view of the wire bundle clamp taken on lines 4,4 of FIG. 1, the view showing a strap locked within a strap receiving member.

The second end 31 of the strap 14 terminates in a cylindrically-shaped protuberance 32, best shown in FIG. 4, which permits the strap 14 to be removably mounted to the housing 12.

The strap 14 may be made of a suitable metal, as is known in the wire bundle and hose clamp manufacturing arts. However, advantageously and preferably, the strap 14 is conveniently molded of a suitable plastic such as polyethylene, polyamide, polyacetal and the like. Plastic materials, respectively known under the tradenames NYLON and DELRIN, are particularly suitable for molding the strap 14. For utilization in the aviation industry, the strap 14 is most preferably made of a polyamide material commercially available in the United States under the trade name HYTREL, which renders the strap 14 capable of functioning at extreme high and low temperatures.

Referring now principally to FIGS. 1 and 4, the strap receiving or housing member 12 is shown to have a main body 34 of substantially elongated and rounded cross-section, two substantially parallel-disposed side walls 36 attached to the main body 34, and a substantially cradle-shaped configuration 38. The cradle configuration 38 is formed by the main body 34 and the side walls 36 extending therefrom. The cradle configuration 38 may also have an anti-skid raised grid pattern (not shown) or the like on its outer surface so as to facilitate gripping and holding the wire bundle 17.

A first and a second elongated opening, hereinafter referred to as first and second slots 40 and 42, are formed in the main body 34 so as to allow the mounting of the strap 14 to the housing 12.

Still referring principally to FIGS. 1 and 4, mounting of the strap 14 to the housing 12 through the first slot 40 is shown. Thus, a cavity 44 is formed in the main body 34 of the housing 12 adjacent to the first slot 40. The cavity 44 is complementary in configuration to the cylindrical protuberance 32 attached to the second end 31 of the strap 14, so that when the strap 14 is passed through the first slot 40, the cylindrical protuberance 32 is snappingly received and held by the cavity 44. This is best illustrated in the cross-sectional view of FIG. 4. However, the strap 14 may also be removed from the housing 12 by dislodging the protuberance 32 from the cavity 44, and pulling the full length of the strap 14 through the first slot 40.

The strap 14, after it is looped around the wire or cable bundle 17 as desired, is then inserted through its first end 20 into the second slot 42. The length of the strap 14 is adjusted by an operator (not shown) by pulling on the free tapered first end 20 of the strap 14 in the direction shown by an arrow on FIG. 4. An aperture 48 incorporated in the strap 14, as shown in FIG. 1, permits pulling of the strap 14 by insertion of a relatively thin object such as a pencil (not shown), narrow screwdriver (not shown) or the like. Alternatively, the strap 14 may be firmly hand-gripped by an operator (not shown) and pulled, so that the use of a tool (not shown) is not required for the tightening of the strap 14 around the wire bundle 17. As the strap 14 is pulled through the second slot 42, its first major surface 22 slides upon the main body 34, and the serrated second major surface 26 faces in an upwardly direction. This is best shown on FIG. 4.

In order to lock the strap 14 relative to the housing 12, and particularly, to prevent it from sliding in a backward direction whereby the grip of the strap 14 around the wire bundle 17 would be loosened, the pawl 16 is mounted to the housing 12 to engage the serrations 30 of the strap 14. Mounting of pawl 16 to the housing 12 and its structure are best shown on FIGS. 1, 4, and 5.

Thus, the pawl 16 includes a substantially flat plate 50 which has a serrated surface 52. Two protrusions 54 extend upwardly from the two sides of the flat plate 50 of the pawl 16. The first plate 56 adapted to be manipulated by an operation (not shown), extends in an inclined angle upward and away from the flat plate 50. Finally, a second plate 58, adapted to act as a leaf spring, extends at an inclined angle, slightly upward and away from the flat plate 50 between the protrusions 54 and in a direction opposite with the operator-manipulated plate 56. Each of the protrusions 54 is provided with an aperture 60 which receives a solid, rod-shaped axle 62 extending between the side walls 36 of the housing 12. Thus, in effect, the pawl 16 is pivotally mounted upon the axle 62.

Figure 5:
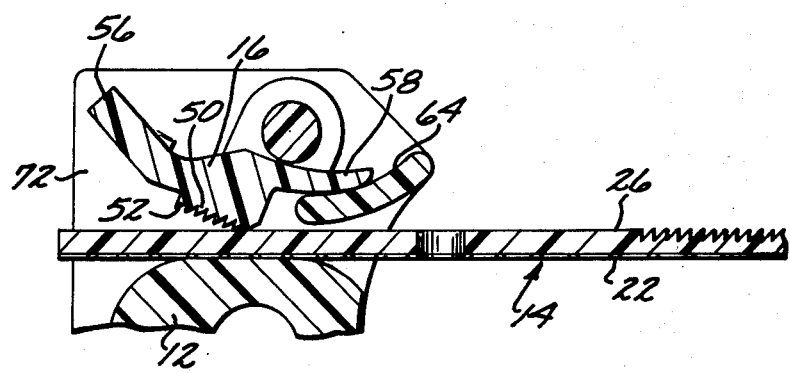
FIG. 5 is a partial cross-sectional view of the wire bundle clamp, the view being analogous to the view taken on lines 4,4 of FIG. 1 and showing the strap member and a pawl member in a configuration wherein the strap member is free to slide within the strap receiving member.

As is best shown on the cross-sectional views of FIGS. 4 and 5, the main body 34 of the housing 12 includes a camming surface 64 which is in contact with the second plate 58 of the pawl 16. The second plate 58, acting as a leaf spring, pushes the serrated surface 52 of the flat plate 50 of the pawl 16 to engage the serrations 30 of the strap 14, and thereby to lock the strap 14 relative to the housing 12. The serrations of the strap 14 and of the pawl 16 are complementary to one another, and both are inclined in such a manner that movement of the strap 14 in the direction of the arrow shown on FIG. 4 is possible by a successive engagement and disengagement of the serrations. Movement of the strap 14 in the opposite direction whereby the loop formed by strap 14 would be largened, is not possible as long as the pawl 16 bears down on the strap 14. In other words, the serrated strap 14 and pawl 16 act as a ratchet mechanism to permit motion of the strap 14 only in one direction.

The serrations of the pawl 16 and of the strap 14, both are preferably at a 45° angle relative to the respective surfaces of the pawl 16 and the strap 14. The pawl 16 is preferably made of the same plastic material as the housing 12, and in the herein-described preferred embodiment specifically adapted for use in the aircraft industry both are preferably made of short glass fiber reinforced HYTREL.

Although the above-described pawl 16 is capable of adequately locking the strap 14 to prevent loosening of the grip of the looped strap 14 on the wire bundle 17, an additional locking mechanism is provided. This is best shown on FIGS. 1 and 3, wherein a small protrusion of one of the side walls 36 of the housing 12 is indicated by the reference numeral 66. The protrusion 66 forms a curved camming surface 68 to be in contact with the first plate 56 of the pawl 16, and to guide it to its locking position. The camming surface 68 terminates in a sudden angular discontinuity, or sharp corner 70. As is readily apparent from an inspection of FIG. 1, once the pawl 16 is pushed beyond the sharp corner 70 it is locked in that position until it is released by manual assistance of an operator (not shown).

FIG. 5 shows the pawl 16 in a position wherein it is held against the biasing force of the second plate 58, and wherein the serrations of the strap 14 and pawl 16 are disengaged. It is readily apparent that in this position, the strap 14 is free to move in either direction, and therefore in this position of the pawl 16, the clamp 10 may be altogether removed from the wire bundle 17.

Figure 2:
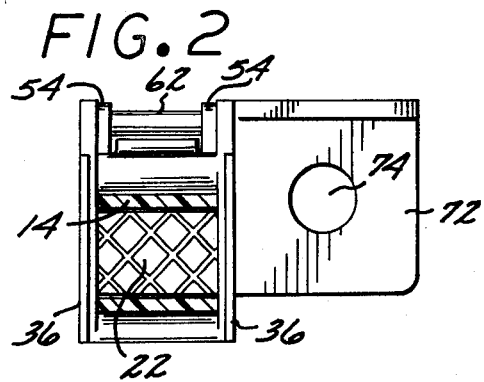
FIG. 2 is a cross-sectional view of the wire bundle clamp taken on lines 2,2 of FIG. 1.
Figure 3:
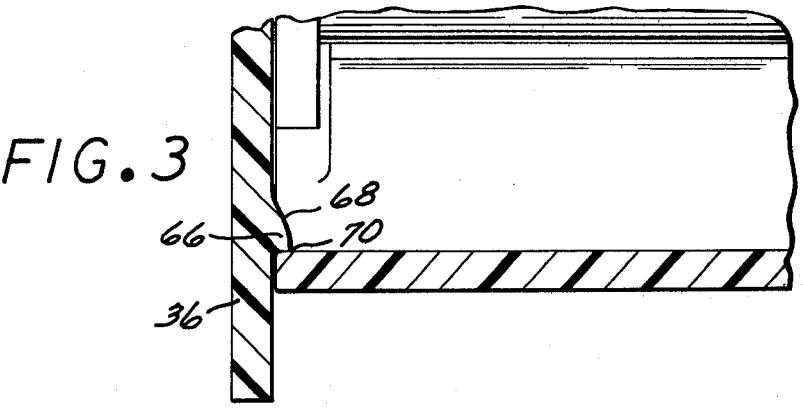
FIG. 3 is another cross-sectional view of the wire bundle clamp taken on lines 3,3 of FIG. 1.

The drawing figures, and particularly FIGS. 1 and 2, show a pair of substantially perpendicularly disposed mounting plates 72 which in the herein described preferred embodiment are integrally molded with the housing 12. The mounting plates 72 project away from one of the side walls 36 of the housing 12 and incorporate a substantially circular aperture 74 in their respective centers. The purpose of the aperture bearing mounting plates 72 is to permit mounting of the clamp 10 upon a suitable rack (not shown), rod (not shown), or the like. An additional aperture 76, which serves the same purpose, is provided in the main body 34 of the housing 12. The three apertures 74 and 76 provide for adaptability of the clamp 10 of the present invention for mounting in a variety of positions relative to a rack (not shown), rod (not shown) or the like.

Figure 6:
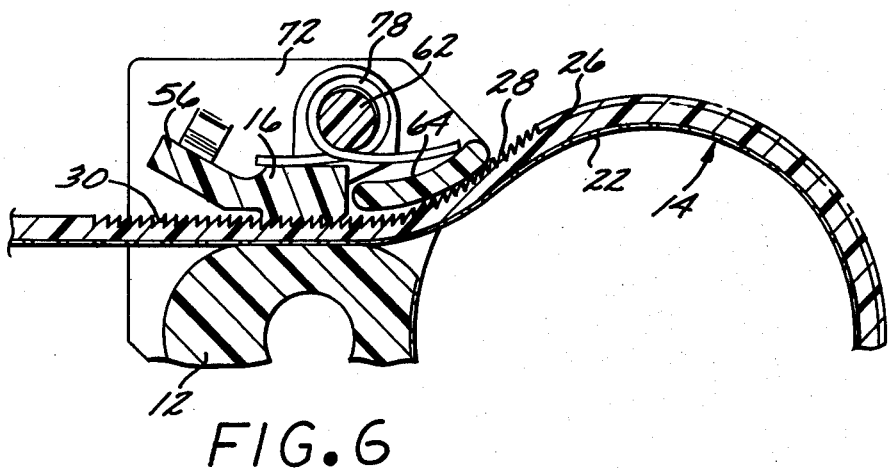
FIG. 6 is a partial cross-sectional view of a second preferred embodiment of the wire bundle clamp of the present invention, the view being analogous to the view taken on lines 4,4 of FIG. 1.

Referring now to the partial cross-sectional view of FIG. 6, a second preferred embodiment of the clamp 10 of the present invention is disclosed. The second preferred embodiment differs from the first preferred embodiment only in that a coil spring 78 is mounted on the axle 62 of the housing 12 to provide a biasing force to the pawl 16 to engage the serrations 30 of the strap 14.

The several advantages and mode of operation of the cable clamp 10 of the present invention should be readily apparent from the above description and from an inspection of the drawing figures. Briefly, the strap 14 may be conveniently removed from the housing 12. It is, however, securely fastened thereto prior to use without requiring application of any tool. Looping the strap 14 around a wire bundle or the like, and tightening of the same may, likewise, be accomplished without the use of tools. While the strap 14 is tightened around the wire bundle 17 or the like, the pawl 16 need not be manipulated by an operator (not shown).

When the strap 14 is locked to the pawl 16, it resists vibrations and shocks so that its grip does not slacken around the wire bundle 17. In order to loosen the strap 14 around a wire bundle 17 or the like, or altogether remove the clamp 14 from the wire bundle 17, an operator (not shown) merely needs to manually pivot the pawl 16 until the strap 14 is free to slide out of the second slot 42 of the housing 12. The clamp 10 may be mounted in a plurality of positions relative to a mounting rack (not shown), rod (not shown), or the like.

The preferred embodiment of the clamp 10 of the present invention, which is made of HYTREL or like material to primarily fit the needs of the aircraft industry, is also capable of adequately functioning for prolonged periods of time in the $-60°$ F. and 120° F. temperature range. Furthermore, the preferred embodiment of the clamp 10 of the present invention may even be exposed for short times to such temperature extremes as 375° F. and $-150°$ F., without affecting the mechanical properties of the clamp 10. Moreover, the preferred embodiment of the clamp 10 is fire resistant, resistant to aromatic fuels, lubricating oils, synthetic hydraulic fluids, to various solvents, such as alcohols, ketones, and resistant to ozone gas. The preferred embodiment of the clamp 10 of the present invention is resistant to fungus, has minimal humidity absorption, high tensile strength, and once ignited, does not release toxic gases.

Since several modifications of the present invention may become readily apparent in light of the above disclosure, the scope of the present invention should be interpreted solely from the following claims.

What is claimed is:

1. A cable clamp comprising:
    a substantially rigid strap receiving member having a main body, a first opening in said main body, a second opening in said main body, and an axle mounted substantially parallel with the second opening;
    a flexible strap having an intermediate portion and a plurality of substantially parallel disposed serrations on one major surface of said intermediate portion;
    means carried substantially at one end of the strap for removably attaching the strap to the strap receiving member at said end of the strap and through the first opening;
    a pawl member pivotably mounted on the axle and having serrations complementary to and capable of engaging the serrations of the strap, the pawl member being pivotable on said axle to a first position wherein the serrations of the strap and the pawl member are substantially disengaged and the intermediate portion of the strap freely passes through the second elongated opening, and to a second position wherein the serrations of the strap and the pawl member are engaged and the intermediate portion of the strap is locked relative to the strap receiving member, and
    biasing means operatively associated with the pawl member and the strap receiving member for biasing the pawl member into the second position, said biasing means capable of being overcome by an exterior force whereby the strap is disengaged from the pawl member at the option of an operator.

2. The invention of claim 1 wherein the serrations of the strap are disposed at substantially right angles to the general longitudinal axis of the strap.

3. The invention of claim 2 wherein the serrations include a plurality of parallel, short plates disposed substantially at a 45 degree angle relative to the major surface of the intermediate portion of the strap.

4. The invention of claim 1 wherein the strap receiving member has a cavity adjacent to the first elongated opening, and wherein the means carried substantially at one end of the strap comprise a protuberance of the strap, the cavity and the protuberance being of complementary configuration to one another whereby the protuberance is snappingly received in the cavity.

5. The invention of claim 1 wherein the biasing means comprise a flexible plate rigidly mounted to the pawl member and a surface incorporated in the strap receiving member, the plate being normally disposed in contact with the surface to bias the pawl member to its first position.

6. The invention of claim 5 wherein the pawl member further includes a portion adapted to be pushed in an upwardly direction by an operator against the biasing force of the plate whereby the pawl member is moved into its second position.

7. The invention of claim 1 wherein the main body of the strap receiving member includes an arcuate surface adapted to be in contact with the cable to be clamped by the cable clamp, the first and second openings being disposed in the arcuate surface, the main body of the strap receiving member further including a pair of substantially parallel disposed side walls each having an arcuate edge which abuts the cable, the axle being mounted between the side walls.

8. The invention of claim 7 wherein a camming surface is incorporated in at least one of the side walls, the camming surface terminating in an abrupt angular discontinuity and cooperating with the pawl member to lock the pawl member into its first position.

9. The invention of claim 1 wherein the strap receiving member is made of fiberglass reinforced Hytrel, and the strap is made of Hytrel.

10. The invention of claim 1 wherein the strap receiving member includes at least two substantially flat plates, each of said plates projecting outwardly from the main body, being substantially perpendicular to one another, and incorporating at least one aperture, whereby mounting of the clamp to a rack, rod or the like is facilitiated.

11. A clamp assembly primarily adapted for clamping avionic wire bundles and attaching the same to a rack, rod and the like, comprising:
    a substantially rigid strap receiving member having an arcuate bundle receiving surface, first and second elongated substantially parallel disposed slot-like openings in said surface, a pair of substantially parallel disposed side walls attached to the arcuate surface and extending in a direction substantially perpendicular to the openings, and a bearing surface adjacent to the second opening;
    a flexible elongated strap member dimensioned to pass through the openings, having a serrated intermediate portion, and a protuberance attached substantially to one end of the strap member, said protruberance being incapable of passing through the first opening, whereby the strap member is removably attached to the strap receiving member;
    a pawl member having mounting means for pivotally mounting the pawl member to the strap receiving member, and serrations complementary to the serrations of the strap member for engaging and immobilizing the strap member, and
    biasing means attached to the pawl member to bias the pawl member into a first position wherein the respective serrations of the pawl member and the strap member are engaged, and wherein the intermediate portion of the strap member is pressed against the bearing surface, said biasing means capable of being overcome by an outside force whereby the respective serrations of the strap member and the pawl member are disengaged from one another.

12. The invention of claim 11 wherein the biasing means comprise a flexible plate integral with the pawl member, and a plate mounted in the strap receiving member between the side walls, the flexible plate and the plate normally bein i ac a and biasing the pawl member into its first position.

13. The invention of claim 12 wherein a rod-like axle is mounted between the side walls of the strap receiving member to be disposed substantially parallel with the elongated openings, and wherein the mounting means of the pawl member comprise a pair of substantially upright abutments of the pawl member, each abutment having an aperture pivotally mounted upon the axle.

14. The invention of claim 13 wherein the biasing means further comprise a camming abutment incorporated in at least one of the side walls of the strap receiving member, the camming abutment having a sudden angular discontinuity and comprising means for guiding the pawl member into its first position and for locking the pawl member into the first position.

15. The invention of claim 11 wherein the protuberance of the strap member is substantially cylindrical having a longitudinal axis substantially perpendicular to the longitudinal axis of the strap member, and wherein a cavity is incorporated in the strap receiving member adjacent to the first elongated opening, said cavity being configured to snappingly receive and removably retain the cylindrical protuberance.

16. The invention of claim 11 wherein a pair of outwardly projecting mounting plates are attached to the strap receiving member, the mounting plates being substantially perpendicular to one another and each mounting plate bearing at least one aperture adapted for mounting the clamp assembly to said rack, rod and the like.

17. The invention of claim 11 wherein the strap receiving member is made of glass fiber reinforced Hytrel, and the strap member is made of Hytrel.

18. In a clamp assembly primarily adapted for clamping avionic wire bundles and the like, and including a strap receiving member having a serrated pawl member, and a serrated strap adapted to be disposed about the wire bundle, the improvement comprising:

means for pivotally mounting the pawl member to the strap receiving member for permitting the pawl member to occupy at least two positions relative to the strap receiving member, in a first position the serrations of the pawl member engaging the serrations of the strap member, whereby the strap member is locked relative to the strap receiving member, in a second position of the pawl member the serrations of the pawl member disengage the serrations of the strap member, and means operatively associated with the pawl member and the strap receiving member to permanently but reversibly bias the pawl member into the first position whereby the strap member is locked relative to the strap receiving member until an outside force overcomes the biasing force, with the pawl member having a flexible plate comprising the biasing means, and the strap receiving member having a surface normally in contact with the plate, thereby biasing the pawl member into the first position.

19. The improvement of claim 18 wherein the strap receiving member includes an axle, and the pawl member is pivotally mounted on the axle.

20. The improvement of claim 19 wherein the strap receiving member includes a protrusion which comprises a camming surface and an abrupt angular discontinuity, the camming surface being adapted to contact the pawl member and guide the same into the first position as the pawl member is pivoted relative to the strap receiving member, the angular discontinuity locking the pawl member in the first position.

* * * * *

UNITED STATES PATENT AND TRADEMARK OFFICE
CERTIFICATE OF CORRECTION

PATENT NO. : 4,458,385
DATED : July 10, 1984
INVENTOR(S) : Cesar Espinoza

It is certified that error appears in the above—identified patent and that said Letters Patent is hereby corrected as shown below:

Column 1, line 49, "3,214,808" should be --3,214,809--.

Column 5, line 14, "operation" should be --operator--.

Column 8, line 56, should be "the plate normally being in contact with one another."

Signed and Sealed this

Twenty-ninth Day of January 1985

[SEAL]

Attest:

DONALD J. QUIGG

Attesting Officer    Acting Commissioner of Patents and Trademarks